Dec. 26, 1944.     O. V. MANSFIELD     2,366,120
BALL BEARING
Filed March 30, 1943
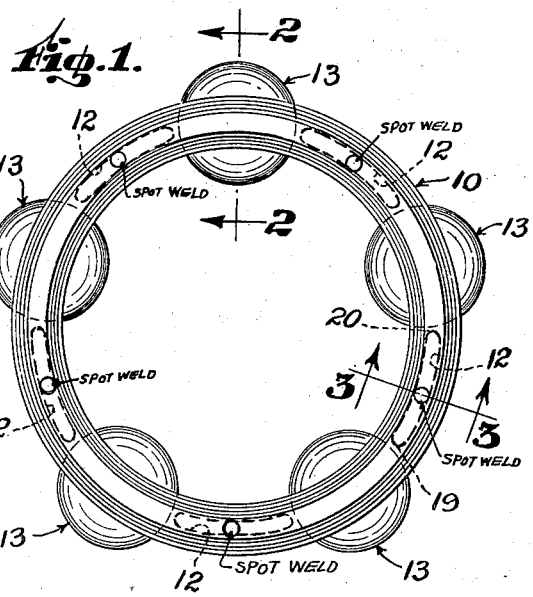
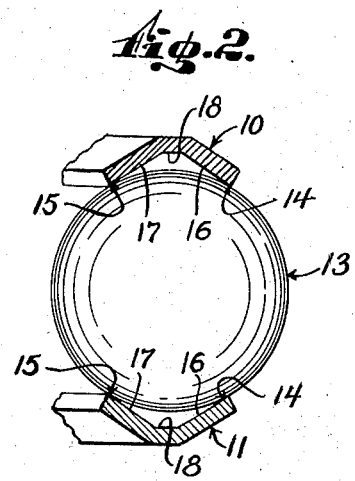
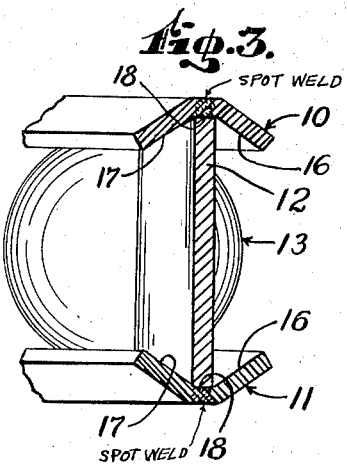
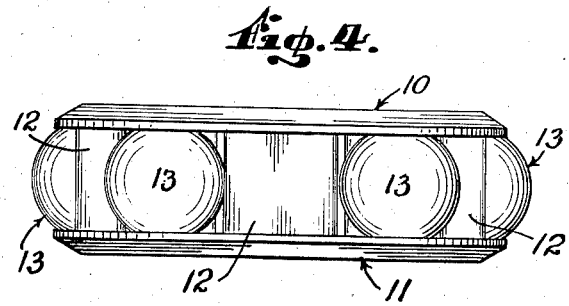
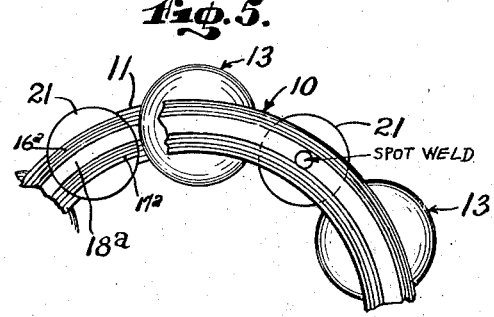
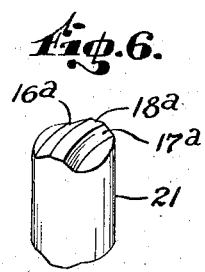
INVENTOR.
OWEN V. MANSFIELD
BY
*Van Deventer & Grier*
ATTORNEYS.

Patented Dec. 26, 1944

2,366,120

UNITED STATES PATENT OFFICE 2,366,120

BALL BEARING

Owen V. Mansfield, Babylon, N. Y., assignor to O. V. M. Products Corporation, a corporation of New York Application March 30, 1943, Serial No. 481,074

6 Claims. (Cl. 308—201)

This invention relates to improvements in ball bearings and is directed more particularly to cages or ball retainers and simplified methods of making the same.

An object of the invention is the provision of a cage formed of two annuluses substantially identical and so formed that the ball or other rolling element is in contact with each annulus at a maximum of two points, thereby minimizing the friction therebetween; and the further provision of a plurality of spacer members circumferentially disposed between said annuluses and welded or otherwise secured to the latter to form a unitary structure. By this arrangement, each spacer member makes a point contact with one ball, further minimizing friction.

Another object of the invention is the provision of an annulus so preformed that a cross-section of the same is generally in the form of a wide angled V, so that the trough of the V facilitates the location of the spacer members radially and the sides of the V near the open end thereof make point contacts with the balls.

A further object of the invention is the provision of spacer members adapted to have their ends secured to said annuluses so as to form therewith a unitary structure. The preferred form of these spacer members, so far as I now know, is rectangular and arcuate to conform to the grooves in my end rings or annuluses. I also show a modification in which the spacers are round sections. I also contemplate and intend to use spacers of tubular and other cross-sectional forms.

The preferred method of securing the rings and spacers together is to spot weld the rings to the ends of said spacers preferably at a mid-point of the end of each spacer, where the latter are of a short arcuate length; and/or at a plurality of points, where the spacers are of a longer arcuate length.

Referring to the drawing:

Figure 1 is an end view of one form of my improved ball bearing cage with balls in position therein;

Figure 2 is a sectional view taken along the line 2—2 of Figure 1;

Figure 3 is a sectional view taken along the line 3—3 of Figure 1, and showing the welded relation of the ring members and one of the spacers;

Figure 4 is a side elevation of the cage shown in Figure 1;

Figure 5 is a fragmentary end view of a modified form of my improved cage employing round spacer members; and Figure 6 is a perspective view of one of the round spacer members.

In the operation of ball bearings, the balls are supposed to run freely in their raceway. There is a tendency for the balls to move at different speeds along the raceway; and further there is a tendency to relatively creep and make contact with each other unless prevented from doing so.

Objectionable friction is developed where adjacent balls crowd together and contact each other, due to the fact that the surfaces contacting each other are moving in opposite directions.

These difficulties have in the prior art been overcome to some extent by providing the ball bearings with cages or separators which separate the balls predetermined intervals apart.

The present invention is more particularly directed toward improvements in the structures of such cages. In the cages of the prior art there is substantial friction between the balls and the cage itself. According to the present invention, I reduce the friction between the balls and the cage to a minimum by providing substantially point contacts between the balls and the cage per se.

Referring to the drawing, the cage consists of annular ring members 10 and 11 equally spaced apart from each other by means of a plurality of spacer members 12. The ring members consist of deformed annuluses which make point contacts with the balls 13 (Figure 2) at two spaced points 14 and 15.

Although a number of different deformations may produce an annulus which will contact the balls at said two points, I prefer to deform the annulus in the form of a wide angled V having substantially flat surfaces 16 and 17 with a flat annular surface 18 therebetween, the width of which is substantially the thickness of the spacer members 12.

The spacer member 12 may consist of rectangular pieces of material arcuately formed so as to be contacted by the flat annular surface 18. The extremities 19 and 20 of the spacer members 12 may be chamfered or rounded to prevent presenting sharp edges to the balls 13.

In assembling the parts to form my new and improved cage, two rings 10 and 11 are turned so that the open ends of the V face each other, and a plurality of spacer members 12 are positioned at the "bottoms" of the V's. The number of spacer members depend upon the spacing to be maintained between the balls. With the parts in a suitable jig which holds said parts in the proper relation and which spaces the spacer members 12 apart, the diameter of the balls, plus the desired amount of clearance, the rings and the spacer members are spot-welded together to form a unitary structure.

The axial length of the spacer members 12 is such that when the members 10, 11, and spacers 12, have been spot-welded together to form the cage, the extremities 14, 14, of the opposed rings, or the extremities 15, 15, thereof, may be sprung apart by the ball itself a sufficient distance for the ball to enter the space therebetween, when the ball is pressed against either of said pairs of extremities to mount them in the cage.

The lengths of the spacer members 12 provide clearance between the ball and one of the rings while the ball is in contact with extremities of the other ring, for example, to provide a clearance between the extremities 14 and 15 of the ring 10 (Figure 2) when the ball is in contact with the lower ring 11 at the points 14 and 15 thereof. This permits the cage to float slightly along the axial line of the ball bearing as the latter is operating, and thereby further reduces the friction between the balls and the cage by eliminating two more points of contact. Obviously, with such spacing the points of contact between the ball and the rings of the cage must either be the points 14 and 15 of the ring 10, or the points 14 and 15 of the ring 11, or the points 14 and 14 of both rings, or the points 15 and 15 of both rings instead of all four points of contact. The points of contact between the spacer members 12 and the balls are, due to the clearance provided between the ball and the point 19 or between the ball and the point 20, but not both the points 19 and 20.

From the foregoing it will be seen that I not only reduce the contact between the balls and the cage to "point" contacts, but I also reduce the number of "point" contacts.

Figure 1 shows a complete cage with five balls in position therein and five spacer members 12 between the balls. Figure 4 shows the same cage with the balls in position therein in elevation.

A modification contemplates constructing the spacer members of material of other shapes than curved rectangular members. One example of a spacer member of another form is illustrated in Figures 5 and 6, in which case the spacer members 21 are formed of rod material of a diameter smaller than the diameter of the balls 13. The extremities or ends of the spacer members 21 are machined to form arcuate surfaces 16ª, 17ª and 18ª, which member up respectively with the surfaces 16, 17 and 18, of the ring members 10 and 11.

In assembling this modified form of cage, the ring members 10 and 11 are positioned in a suitable jig which also properly spaces the spacer members 21, following which the ring members and spacer members are spot-welded together to form a unitary structure.

Although I have herein shown and described a ball bearing cage having rectangular arcuate spacer members and a modification showing round spacer members, it must be understood that I do not wish to limit myself to these two specific forms of spacer members, because it is obvious that spacer members of other shapes and forms may be substituted without departing from the spirit of the invention as set forth in the following claims.

What is claimed is:

1. In a cage for ball bearings, a pair of ball retaining rings, a plurality of spacer members circumferentially spaced between and defining the space-relation of said rings, and means for securing said rings and said spacer members together to form a unitary structure, said rings being formed to include annular faces contacting said spacer members and annular lips adapted to make point contacts with said balls.

2. In a cage for ball bearings, a pair of ball retaining rings each being preformed to have a cross-section in the shape of a wide angled V, the surface joining the legs of said V comprising a flat annular surface lying in a plane cutting the axis of said cage at a right angle, said rings being spaced apart from and facing each other, and a plurality of spacer members contacting said annular surface and circumferentially spaced apart from each other, said rings and said spacer members being welded together to form a unitary structure.

3. In a cage for ball bearings, a pair of ball retaining rings each being preformed to have a cross-section in the shape of a wide angled V, the surface joining the legs of said V comprising a flat annular surface lying in a plane cutting the axis of said cage at a right angle, said rings being spaced apart from and facing each other, and a plurality of arcuate spacer members having their ends contacting said annular surface and located radially by said surface, said spacer members also being circumferentially spaced apart from each other, said rings and said spacer members being welded together to form a unitary structure.

4. In a cage for ball bearings, a pair of ball retaining rings, a plurality of spacer members circumferentially spaced between and defining the space-relation of said rings, and means for securing said rings and said spacer members together to form a unitary structure, said rings being formed to include annular faces contacting said spacer members and angular sides contacting said balls adjacent to the extremities of the inner and outer edges of said rings.

5. In a cage for ball bearings, a pair of ball retaining rings, each being imperforate and preformed to have a cross section of the shape of a wide-angled V, the surface joining the legs of said V, comprising a flat annular surface lying in a plane cutting the axis of said cage at a right angle, said rings being spaced apart from and facing each other and adapted contact balls subsequently retained therein at point contacts, a plurality of spacer members contacting the annular surfaces of said rings, said spacer members being arcuate in form with their end faces circumferentially spaced at right angles to the planes of said rings, said rings and said spacer members being welded together to form a unitary structure wherein a maximum of six possible points of contact between said cage and each ball is possible.

6. A cage for ball bearings, according to claim 5, in which there are six possible points of contact but only three actual points of contact, said possible points of contact are each leg of each V and the adjacent ends of neighboring spacing members, and the actual points of contact are one leg of each V and one edge of a spacer member.

OWEN V. MANSFIELD.